Sept. 18, 1956 M. BARLOW 2,763,186
COLLAPSIBLE THREE PANEL MULTIVIEW MIRROR
Filed Jan. 31, 1955
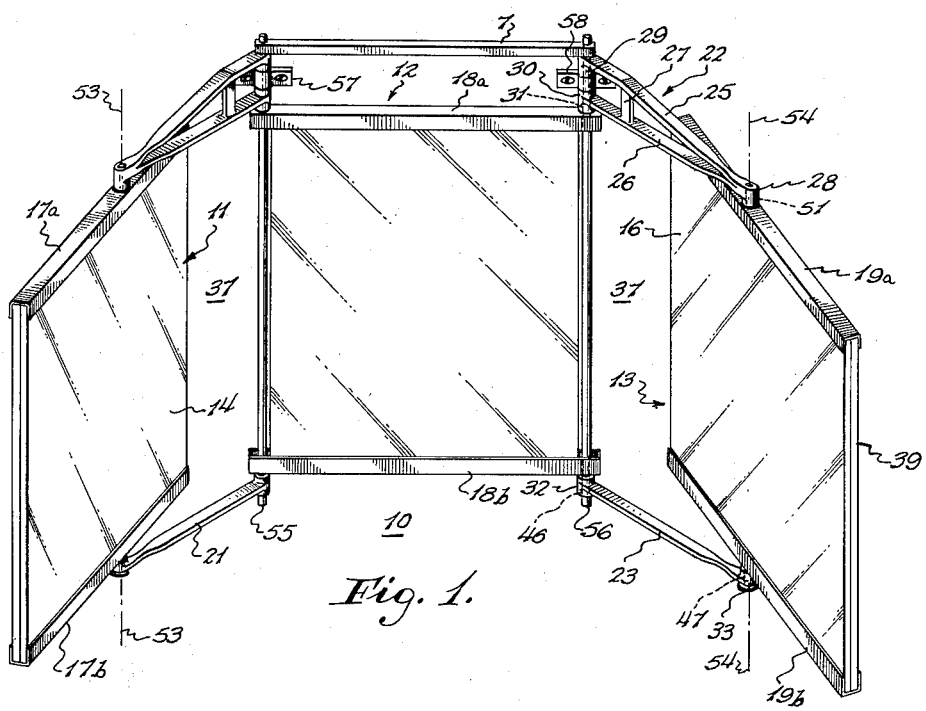
Fig. 1.
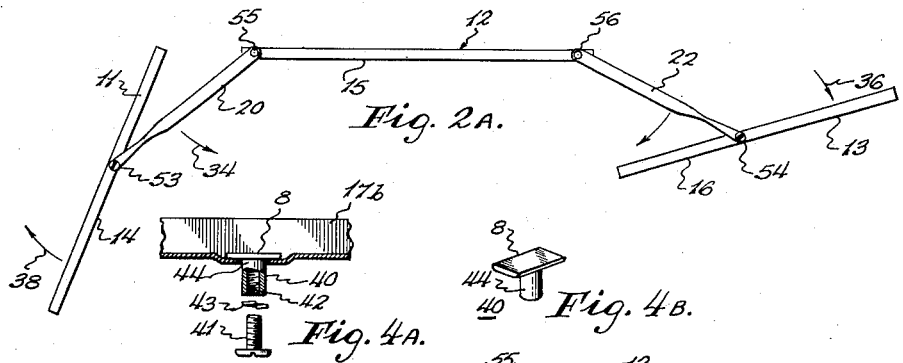
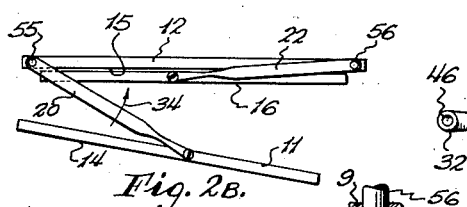
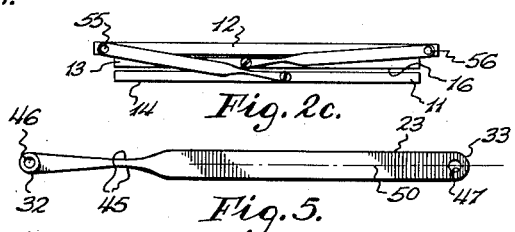
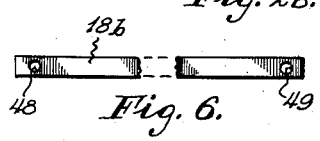
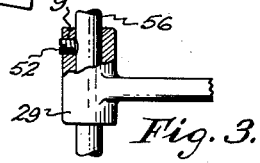
INVENTOR
MEYER BARLOW
BY E. J. Lovette
ATTORNEY

United States Patent Office 2,763,186
Patented Sept. 18, 1956

2,763,186

COLLAPSIBLE THREE PANEL MULTIVIEW MIRROR

Meyer Barlow, Hempstead, N. Y., assignor to Marsel Mirror and Glass Products, Incorporated, Brooklyn, N. Y., a corporation of New York Application January 31, 1955, Serial No. 484,971

2 Claims. (Cl. 88—85)

The present invention relates to a novel mirror structure, and in particular, to a three-element mirror which may be opened or collapsed, as desired, and which retains its reflecting properties both in its opened or collapsed states.

Many places of business require mirror displays as an adjunct of their selling activities. For example, in a men's retail clothing store, the familiar three-panel multiview mirror enables the customer to obtain front, side and rear views of himself. This familiar mirror consists of three unadjustable, juxtaposed mirror plates or panels permanently attached to a wall. To avoid taking up considerable and valuable floor space or to avoid it becoming an unsightly appendage of a wall, the three-element mirror is usually recessed into the wall, alcove fashion. An arrangement of this sort has the disadvantage of being permanently fixed to a wall; and it is not adjustable. The mirror cannot be moved without requiring an expensive alteration. Moreover, to use the mirror, customer and sales personnel must walk to and from the mirror from all parts of the store.

Furthermore, locating two or more of such mirrors in a store is costly because of the very valuable wall space each mirror covers. Wall space is important because it is used to store or display the articles on sale, and the prior art mirror covers a portion of a wall comparable to the width of the three individual mirror plates.

For some types of stores, wall space is too valuable to be used to support or mount a three-panel mirror. For other stores, there may not be enough accessible wall space. Whatever the reason, occasionally it is necessary or convenient to mount the three-panel mirror on casters so that it can be moved from one place in the store to another. Caster mounting has the advantage of relieving the wall for other purposes. Furthermore, it allows the mirror to be moved when the need arises. In spite of these advantages, certain limitations are also present to discourage extensive use of the mobile three-element mirror. The prior art type of mirror takes up a great deal of floor space and becomes a grotesque obstruction about which sale personnel and customers must maneuver. Secondly, it is unwieldy. Furthermore, because of its size, it becomes troublesome in stores of small floor area.

It is almost universal that each household has at least one mirror for dressing purposes. The mirror is generally mounted on a wall or on one side of a door. It would certainly be desirable to many persons to have a multiview three-element mirror in their homes such as are used in stores. But because of their unwieldy size, such a device becomes prohibitive.

The instant invention contemplates a three-panel mirror structure which avoids the shortcomings of the prior art mirrors mentioned hereinbefore. The three-panel mirror consists of a center panel and two adjustable side panels suspended from the center panel. The novel structure of the instant invention involves a frame and mounting structure that enables the observer to enjoy complete front, side and rear views at all angles; and in addition, the structure permits the mirror to be folded to form a single panel mirror.

In its folded condition, the two side panels are superimposed in tandem relationship in front of the center panel. In this state, the folded mirror appears to be a single panel mirror. By merely pulling the side panels to their respective unfolded positions, the mirror combination becomes a multiview three-panel mirror. Moreover, the frame structure is pivoted so that the side panels can be adjustably positioned to any desired angle.

Since the novel mirror combination is no wider than a single paneled mirror when folded, it takes up approximately one-third the wall space covered by the prior art mirrors mentioned hereinbefore. Accordingly, it is now practical to have a household three-panel mirror because it requires for mounted purposes, no more room than the simple, single-panel unit. Furthermore, when it is in its folded state, the novel combination serves as a single panel mirror because one of the side panels is exposed to view when it is folded.

The fact that my novel mirror structure requires only one-third the mounting space is also of vast importance for business use. The folding frame structure of my invention allows a more economical use of store wall space. This is a decided advantage to the small store where wall space is at a premium. In addition, there is a major advantage to its adoption to caster mounting where its use can replace the grotesque and obstructing prior art mirror structure mounted on casters. A multitude of mirrors of my invention mounted at spaced intervals in a store having an abundance of wall space will permit convenient and concurrent use by many customers.

Further, desirable features are provided by the use of the instant invention which offer striking advantages over the use of the prior art structures. The prior art mirror is not easily and completely fabricated at the factory. Accordingly, the prior art structure is not assembled and shipped to its final destination in condition for installation by a lay person. To mount the prior art mirror in its alcove requires installation by a competent and highly skilled carpenter or cabinetmaker. Actually, the installation or relocation of the prior art mirror is often a major and expensive alteration of carpentry work.

In contrast, a mirror built in accordance with the instant invention is completely assembled at the factory. In addition, it may be installed in a store or home by a lay person; it does not require installation by skilled cabinetmakers. The instant invention provides a structure design that permits manufacture and assemblage by economical mass production techniques. Its compactness and light weight avoids expensive transportation costs. Its compactness permits the over-the-counter sale, for example, in a department store or in a local hardware store.

The mirror of the instant invention is mounted to a wall or one side of a door by means of brackets located alongside of its center panel. Ready made screw holes in the brackets permit the mirror to be mounted by screws. Anyone capable of handling a screwdriver can install the mirror.

It is therefore a principal object of the instant invention to provide a novel three-panel mirror structure; this structure contemplates a center panel mirror and two adjustably and rotatably mounted side panel mirrors suspended from the center panel. Another object is to provide a three-panel mirror structure which occupies, for mounting purposes, approximately one third the space used by the comparable prior art structures. A further object of the instant invention is to provide a mirror structure by which a three-panel mirror may be easily converted to a single paneled mirror and vice versa; the conversion is achieved by folding in the two rotatably suspended side panels flat against the center panel to effect a single panel mirror condition, and unfolding the side panels to effect the multiview three panel condition. A further object is to provide an adjustable three-panel mirror capable of providing a complete front, side and rear views at all angles. A further object is to provide a three-panel mirror that can be mounted on a vertical wall and which can be folded to form a flat single mirror unit. Another object is to provide a mirror structure capable of the dual functions of providing on one hand an adjustable three-panel view and on the other hand a single unit view.

It is a further object to provide a multiview mirror structure that is capable of being completely fabricated at a factory by mass production techniques. It is a further object to provide a compact and light weight multiview mirror structure which allows easy installation by a lay person.

These objects and also others will become evident upon consideration of the following description and are achieved by the employment of a novel method of suspending two rotatable side mirror panels of the assemblage. The two suspended panels are each supported by a pair of arms which are rotatably mounted to the center panel. Each of the two side panels is in turn arranged to rotate with respect to its respective axis at the outer ends of its supporting arms. With this form of mounting, the side panels can be opened to any desired angle for side and rear views. In the preferred embodiment, the side panels are the two units mounted for adjustable suspension to provide side views at any angle. The above objects will become apparent from a consideration of the following detailed description taken in conjunction with the accompanying drawing in which:

Fig. 1 is a front view, in perspective, illustrating a three panel mirror opened for multiangled views and incorporating the principles of the instant invention;

Figs. 2A, 2B and 2C are top views of the embodiment of Fig. 1 showing successive stages of the mirror being folded;

Fig. 3 illustrates the set screw structure of the inner collars of the supporting arms;

Figs. 4A and 4B illustrate the protuberant portion of the frames of the side panels and the elements of the pivotal pin;

Fig. 5 illustrates the shape of the arms as seen from the top or bottom; and

Fig. 6 illustrates a view of the frame for the center panel.

Fig. 1 illustrates a three panel mirror 10 embodying the improvements of the instant invention. The structure consists of three plane members 11, 12, 13, each having on one side thereof mirrored surfaces consisting of mirrors 14, 15, 16, respectively. Mirrors 14, 15, 16 are held in position by frames 17a, 17b, 18a, 18b, 19a, and 19b. Frames 17a to 19b, preferably made of metal, are U-shaped in cross-section to receive the upper and lower edges of the engaged mirror plate and its backing 39; note Fig. 6 as an illustrative example. Each mirror and its backing 39, the latter may be a sheet of beaver board, are held in position by being tightly gripped in the inner channel of its respective upper and lower frames.

Upper and lower frames 17a, 17b, 19a and 19b of the two side panels 11, 13 are identical. The frame length is equal to the width of the side mirror members. Frames 17a, 17b, 19a and 19b are each provided with an outer protuberance having an opening to receive a bearing pin 40. The protuberance is located off-center along the frame. The reason for not locating the protuberance and opening for pin 40 midway the ends of the frame will be discussed in detail in another part of the description.

The upper and lower frames 18a and 18b used for center panel 12 are identical. Frames 18a, 18b are longer than the width of mirror plate 15 for the purpose of properly mounting hinge pins 55 and 56. Frames 18a, 18b have a pair of spaced bearing holes 48, 49 each located near an opposite end of the frames. Bearing holes 48, 49 are provided to receive respective hinge pins 55, 56 therethrough. It is desired that pins 55, 56 rotate without restraint within respective holes 48, 49. Accordingly, hinge pins 55, 56 are spaced laterally a small distance from the adjacent sides of the center mirror plate 15 by means of properly locating holes 48, 49 along upper and lower center frames 18a, 18b.

While members 11 and 13 are shown mirrored on but one surface, it is within the scope of the invention to mirror the other or rear surfaces of members 11 and 13. The geometry of members 11, 12, 13 is shown to be rectangular; nevertheless, other substantially plane shapes, such as ellipses or circles will operate as well.

Member 12 is adapted to be fixedly mounted to a supporting vertical surface, such as a wall, door or partition, by means of brackets 57, 58. Side members 11 and 13 are supported by member 12 and are arranged to be moved with respect to member 12.

Side members 11, 13 are supported at the top ends thereof by heavy reinforced arms 20, 22 and at the bottom ends thereof by comparatively lighter arms 21, 23. Economy of manufacture is achieved by making the pair of upper arms 20, 22 identical. For the same reason, the pair of lower arms 21, 23 are also identical. The arms may be made of steel, iron or some other structurally strong material. For household uses, the arms may be properly ornamented. Since upper arms 20, 22 are identical, only one will be described in detail in conjunction with Fig. 3. Upper left arm 22 is provided with a vertical cylindrical collar 28 having an internal bore 51 extending therethrough. Two vertically and axially aligned cylindrical collars 29, 30 are provided at the other end of arm 22. Collars 29, 30 have aligned internal bores 50, 31 extending therethrough. Horizontal element 26 extends between collars 30 and 28. Upper elements 24, 25 extend between collars 29 and 28. Upper element 24 extends horizontally from collar 29 a short distance and then joins the inclined element 25; the latter in turn is joined to collar 28. For additional strength, a vertical element 27 extends from an element 26 to the junction of elements 24, 25. Collars 29, 30 are spaced apart axially to receive a vertical and cylindrically shaped mounting bracket 58 therebetween. The components of arm 22, i. e., collars 28, 29, 30 and elements 24 to 27, may be fabricated from a single integral piece of metal to achieve structural strength and economy of manufacture.

The principal support for members 11, 13 is effected by upper arms 20, 22, consequently lower arms 21, 23 are made comparatively lighter in stucture. Since arms 29, 30 are identical in structure, only one will be described in detail. Arm 23 is a simple horizontal element similar in shape to element 26. Arm 23 has vertical, cylindrical collars 32, 33 at its opposite ends. Internal bores 46, 47 extend through respective collars 32, 33. The horizontal element or arm 23 and its two collars 32, 33 may be fabricated out of a single, integral piece of metal for manufacturing economy.

From top views, Figs. 2A, 2B and 2C, and clearly from Fig. 5, it is seen that recesses 45 are provided adjacent the outer ends of arms 20, 21 and 23. The arms are recessed on both sides of the center line 50. Recesses 45 provide the clearance to allow panel members 11 and 13 to be folded one against the other. Without the recesses 45, upper arms 20, 22 would abut when mirror 10 is almost folded closed and thus prevent members 11 and 13 from resting one against the other as shown in Fig. 2C. The same interference would exist between arms 21, 23 without recesses 45.

In operation of the disclosed embodiment, it is desired that arms 22 and 23 rotate about a vertical axis extending along the right hand edge of member 12. The axis of rotation is the axis of hinge pin 56. A similar relationship is required with respect to arms 20 and 21 and a vertical axis along the left hand edge of member 12. In this case, the axis of rotation is the axis of hinge pin 55. The upper and lower frames 18a and 18b are provided with bearing holes 48, 49, one at each corner; note Fig. 7. The long hinge pins 55, 56 are maintained in parallel relationship and are vertically mounted to revolve within respective bearing holes 48, 49. Pins 55, 56 may be of length to extend slightly beyond collars 29 and 32, respectively at the top and bottom of the said mirror panels. Pin 55 extends through holes 48 of frames 18a and 18b along the left hand side of member 12, and pin 56 extends through holes 49 of the same frames along the right hand side of member 12. Pins 23, 24 are made of a solid round steel stock.

Arm 22 is supported or carried by pin 56; the upper part of pin 56 extends through internal bores 50, 31 of collars 29, 30. Arm 22 is arranged to rotate in unity with pin 56 by a pair of set screws 52. Each screw 52 threadedly engages a radial horizontal threaded bore 9 in collars 29, 30. The inner ends of screws 52 are caused to bear firmly against hinge pin 56. Thus in rotation about the axis of bores 50, 31, arm 22 and hinge pin 56 rotate as an integral structure. For the operation of the instant invention, it is required that lower arm 23 rotate about the axis of pin 56 in unison with the rotation of upper arm 22 about the same axis. Accordingly, arm 23 is also firmly attached to pin 56 by means of a similar set screw arrangement. Pin 56 extends through internal bore 46 of collar 32. Pin 56 is made integral to arm 23 by means of a set screw threadedly engaging a threaded horizontal bore in collar 32 in same manner as described above. Consequently arms 22, 23 and pin 56 rotate as a single integral structure about the axis of pin 56.

The same arrangement is repeated on the left-hand side of panel member 12 with respect to arms 20, 21 and pin 55. Arms 20, 21 and pin 55 are arranged to rotate as an integral structure about the axis of pin 55.

The outer ends of arms 22, 23 pivotally engage respective bearing pins 40 carried by frames 19a and 19b. Pin 40 has a smooth cylindrical outer surface 44 of a length conveniently longer than the respective collars 28, 33 engaged therewith. One end of pin 40 is provided with an internal threaded bore 42 adapted to engage screw 41. The other end of pin 40 is provided with a rectangular-shaped flange 8. Flange 8 is adapted to engage a recessed seat in the internal U channel of the frame. The seat is shaped to correspond to the shape of the flange so that when the flange is seated therein, pin 40 cannot revolve about its own axis. The cylindrical body 44 of pin 40 extends through a hole at the recessed seat and protruding outwardly from the frame. The recess seat prevents rotation of the pin 40 with respect to the frame. The recess also serves to provide enough clearance so that the flange end 8 does not interfere with the edge of mirror plate or its backing which engages the internal channel of the frame.

The pivotal engagement of outer ends of arms 22, 23 is effected by extending the cylindrical body 44 of pins 40 into the internal bores 51, 47 of collars 28, 33. Each collar and pin 40 is held in pivotal engagement by screw 41 threadedly engaging bore 42. Screw 41 has head larger than the engaged collar to prevent the collar escaping from the pin. The cylindrical body 44 is made long enough to prevent the screw head of screw 41 from clamping the collar against the adjacent frame. Should the collar become clamped against the frame it would prevent rotation of the collar with respect to the pin. A split washer 43 may be used to ensure that screw 41 does not work itself loose while the mirror is in use.

A similar pivotal arrangement is repeated on the left-hand side of mirror 10. Thus, the collars at the outer ends of arms 20, 21 are also arranged for pivotal engagement with respect to pins 40 fixed to frames 17a and 17b.

The pins 40 for each mirror member lie in the same longitudinal axis. For example, pins 40 lie along axis 53 for member 11, and are in the axis 54 for member 13. Thus, mirror panels 11, 13 are arranged to rotate about axes 53, 54, respectively and pins 40 are arranged to rotate within the bores of the respective collar engaged therewith.

It is desired that panel members 11, 12, 13 rest flat against each other when mirror 10 is completely folded as illustrated in Figure 2C. Accordingly, clearance between the adjacent sides of panels 11 and 12 on the left and panels 12 and 13 on the right is so provided that side panels 11 and 13 can be swung about axes 55, 56 respectively, without any interference. The clearance spaces are designated as 37 in Fig. 1. The clearance on either side of member 12 avoids members 11 and 13 from abutting against member 12 as the units are being folded.

It is also desired that when mirror 10 is folded as illustrated in Fig. 2C that the sides of the panels coincide to avoid transverse overlap. Such overlap would cause the side panels to extend transversely beyond the center panel. This would detract from the appearance of the mirror and also cause the mirror to take up more space in width when folded.

Flat compactness and avoidance of overlap are achieved by properly spacing members 11 and 13 from member 12 and by pivoting members 11 and 13 along axes 53, 54, respectively, which axes are slightly off center. It will be noted that pins 40 are not located midway between the ends of the side panels or frames 17a, 17b, 19a, 19b. For member 11, pins 40 (or axis 53) are slightly to the right of the midpoint between the ends of frames 17a, 17b. For member 13, pins 40 (or axis 54) are slightly to the left of the midpoint between the ends of frames 19a, 19b. In the illustrated embodiment, the width of each side panel and the length of the frame therefor was chosen to be 12 inches. The distance between the center of the hole through which pin 40 extends and the nearer end of the frame, i. e. the distance from axis 53 or 54 to the nearer end of its frame was chosen to be 5½ inches. For the particular embodiment disclosed, axes 53 and 54 are each off-centered by an amount of ½ inch. In complementing the particular off-center dimension of the instant embodiment, the horizontal distance between the centers of the internal bores 31 and 51 was chosen to be 6¾ inches. Similarly, the horizontal distance between the axes of bores 46 and 47 is also 6¾ inches. Thus, the radial distance between hinge axis 55 and pivot axis 53 is 6¾ inches; the radial distance between hinge axis 56 and pivot axis 54 is the same. The other dimensions of the embodiment described herein are: mirrored surface 15 is 12 inches wide, and the horizontal distance between the axes of pins 55, 56 is 12¼ inches.

It was noted hereinbefore that three panel mirror 10 of the instant invention can be compactly and neatly folded without overlap when closed because of the manner it is hinged. The thickness of panels 11 and 13 does not have any perceptible bearing upon or otherwise affect the desired result because the depth dimension of these panels is appreciably less than the radius of the arms, i. e., the radial distance between axes 53 and 55. For the illustrated embodiment, the thickness of panels 11, 13, and also panel 12, is the same and is of the order of the diameter of pins 55, 56. Actually the thickness of the panel 12 is slightly larger than the diameter of pins 55, 56 because frames 18a, 18b accommodate bearing holes 48, 49. For the illustrated embodiment, the diameter of pins 55, 56 measure slightly less than ¼ inch. Thin panels are easily obtained because they are made from standard commercially available plates of mirror glass and backing, each individually consisting of a thin sheet of material.

It will be understood that the specific dimensions set forth in the preceding paragraph apply to a particular embodiment. The width of the mirror panels determines the applicable dimensions. A mirror structure of different width will call for different size arms and a larger or smaller amount of off-centering for the pivotal pins. In each case, the horizontal distance between axes 54 and 56 (and between axes 53, 55) and the distance from pivotal pin 40 to the center of its frame are chosen to enable the mirror members to be folded flat one against the other without transverse overlap.

Furthermore, the above dimensions are not affected by the length of mirror 10. It is within the scope of this invention to lengthen mirror 10 so that it offers a conventional full length view or shorten the panels so that mirror 10 is vanity size. In either case, the same horizontal dimensions apply if the corresponding mirror panels of the vanity model and full length model have the same width dimensions.

Mirror 10 may be mounted to a vertical wall by means of attaching cylindrical brackets 57, 58 to the wall by means of screws. Brackets 57, 58 are dimensioned to fit between the inner collars of upper arms 20, 22. Brackets 57, 58 have internal bores through which pins 55, 56 extend and revolve.

It has been found that while mounting mirror 10 to the vertical wall that the weight of the side panels 11, 13 tends to pull the top ends of hinge pins 55, 56 outwardly and thus cause an undesirable spread. This is particularly so for the full length mirror because of the greater weight of its side panels. The pull out or spread is prevented by mounting a horizontal bar 7 having two properly spaced holes to engage hinges 55, 56. By this means, pins 55, 56 are held in parallel relationship and spread is prevented. Bar 7 may be removed once mirror 10 is fixed to the wall; however bar 7 may be left on mirror 10 because it does not interfere with its operation since the hinge pins 55, 56 are free to revolve within the holes of bar 7.

A mirror incorporating the assemblage of elements described hereinbefore may be used as a three panel mirror, as shown in Fig. 1, or as a single panel mirror as shown in Fig. 2C. It will be understood that the mirror can also be used as a two panel device by merely folding in only one of the side panels, member 11 or 13. The opened position of Fig. 1 provides front, side and rear views that are made possible by a three panel mirror. However, the instant invention offers a further feature. Since the side panels are each themselves rotatable about the two axes, member 11 is pivoted to rotate about axis 53 and the axis of pin 55; whereas member 13 is rotatable about the axis 54 and the axis of pin 56, side panels 11, 13 can be adjusted to provide an infinite combination of angular views. When three panel mirror 10 is not needed, the mirror easily folds to save space. The mirror may be folded so that either mirror surface 14 or 16 of members 11 or 13, respectively, remain facing outward.

The structure of the instant invention is designed so that mirror 10 may be collapsed or opened very easily. All that is required is a slight hand pressure on side panels 11 and 13. Figures 2A, 2B and 2C illustrate this point. Fig. 2A is a view of the assemblage looking from above and shows mirror 10 in its opened condition. To fold mirror 10, mirror member 13 and its appended arms 22, 23 are caused to rotate clockwise about axis 56. Arrow 35 indicates this clockwise rotation; mechanically, arms 22, 23 and pin 56 are caused to rotate as an integral structure in the clockwise direction about the axis of pin 56. A simple guiding pressure applied by hand on member 13 will bring this about. Simultaneously, mirror panel 13 is caused to rotate clockwise about axis 54 so that mirror 16 faces in the forward direction. Arrow 36 indicates this motion. A counterclockwise rotation of member 13 about axis 54 could cause a transverse overlap and a slight exposure of backing 39. This would not be desirable from an appearance point of view. It is therefore preferable that mirrored surface 16 be turned to face in the forward direction. Fig. 2B shows member 13 in its folded position, adjacent, directly in front of and resting against center panel 12. A similar treatment of right hand panel 11 will bring it to its folded position. Panel 11 and arms 20, 21 and pin 55 are revolved as an integral structure counterclockwise about the axis of pin 55. This motion is illustrated by arrow 34. Panel 11 in turn is revolved about axis 53 in a clockwise direction, note arrow 38. It is preferable that the top panel, in this example member 11, be turned so that its mirrored surface 14 faces in the forward direction. If mirrored surface 14 were caused to face in the reverse direction, backing 39 would be exposed to view and the advantages of a single panel mirror would be lost. Although the structure could be fabricated with plane mirrors on both sides of the right-hand and left-hand panel members 11, 13, this is actually unnecessary and aesthetically undesirable because of overlap. It is just as easy to fold the side panels to cause the mirrored surfaces thereof to face in the outward direction.

Fig. 2C shows mirror 10 completely folded with its three panels superimposed, tandem fashion, with panel 11 resting flat against panel 13; the outer mirrored surface 14 is exposed for use. The example described herein contemplates panel 11 as the outer panel, since this panel was folded in after panel 13. In a similar manner, panel 11 could have been collapsed first against center panel 12, resulting in mirrored surface 16 of panel 13 becoming the outer mirror exposed for use.

The embodiments and illustrations disclosed herein should be taken as illustrative examples using the principles of the invention and should not be taken in any limited sense.

What is claimed is:

1. A reflecting device comprising, a plurality of mirror surfaced members having top and bottom and opposite side edges, said members being substantially identical in size, upper and lower frames having inner channels into which said top and bottom edges of said mirrored surfaces extend and are gripped, the upper and lower frames of the first of said members having integral portions protruding laterally and outwardly from said opposite side edges of said first member and having aligned bearing holes in the protruding portions thereof, said bearing holes lying in the plane of said first member, a hinge pin contiguous to and extending vertically along each side of said first member and rotatably mounted in the aligned bearing holes, a pair of upper and lower arms supported at their inner ends by each hinge pin respectively above and below said bearing holes of correlated upper and lower frames, said arms extending from the supporting hinge pin laterally a distance greater than one half the lateral length of said members, and aligned pivotal means mounted at the upper and lower frames of the other of said members, said means of each of said other members pivotally engaging a respective pair of arms along a vertical axis spaced from the correlated supporting hinge pin a distance greater than one half the lateral length of said members, the vertical center line of each of said other members being spaced from said axis thereof a distance substantially less than one half the lateral length of said members, the adjacent side edges of said members being spaced a relatively short distance apart when said other members being unfolded and substantially coplanar, the portion of said arms adjacent said pivotal means being sufficiently narrow in the horizontal dimension transverse to its lateral length to provide clearance at said portion of said arms upon folding close the last of said other members, the depth dimension of said other members being relatively small in comparison to the distance from said hinge pin to the vertical axis of said other member supported thereby, said aligned pivotal means comprising, an outward protuberance along said upper and lower frames of said other members, the protuberant portions of said frames being in alignment, said outward protuberances forming a flanged seat in the inner channels of said frames, each of said upper and lower frames of said other members having an aligned opening located amidst the protuberance thereof, and a pivotal pin for each upper and lower frame of said other members, said pivotal pin having a cylindrical body and a flanged end, said body extending through the protuberance opening of a respective frame and pivotally engaging the outer end of a respective arm, the flanged end of said pin engaging the inner channel seat of said respective frame, whereby rotation of said pin is prevented, and whereby each of said other members being rotatable about the axis of its pivotal means and rotatable in unison with its correlated supporting hinge pin to permit said other members to be folded close in any sequence over said first member without overlap along their edges.

2. A reflection device comprising, three juxtaposed plane mirror members of substantially identical size and having top and bottom and opposite side edges, upper and lower bearing supports protruding laterally from the opposite sides of a first of said members, said bearing supports being attached directly to said first member, said supports having vertically aligned bearing holes at the portions thereof protruding outwardly from said opposite sides of said first member, said bearing holes being substantially coplanar with respect to said first member, first and second hinge pins each extending vertically through respective aligned holes contiguous to and along an opposite side edge of said first member, said pins being rotatable within said holes and being substantially coplanar with respect to said first member, a pair of upper and lower supporting arms secured at their inner ends to the correlated upper and lower ends of each hinge pin, said arms being secured to said hinge pins above and below said upper and lower bearing supports to maintain said hinge pins in place, each arm extending laterally along a straight line perpendicular to the vertical axis of the pin to which the arm is secured a distance greater than one half the lateral length of said members, and means for pivotally supporting the other of said mirror members between respective pairs of said arms, each of said other members being pivotally supported for rotation along an off-centered vertical axis in the plane thereof, said off-centered axis of each of said other members being spaced from the vertical center line thereof a distance substantially less than one half the lateral length of said members, said off-centered vertical axis of each of said other members also being spaced a distance greater than one half the lateral length of said members from the hinge pin to which its supporting arms are attached, each of said other members being rotatable about two parallel axes, one being the hinge pin to which its supporting arms being attached and the other being its respective off-centered vertical axis, said bearing supports comprising frames having inner channels into which correlated top and bottom edges of said first member extend, said frames serving the dual purpose of gripping the components of said first mirror member to hold same together and providing the bearing holes for said hinge pins, and said pivotal means comprising aligned pivotal pins extending along said off-centered vertical axis from the top and bottom edges of said other members, said pivotal pins engaging respective ones of said supporting arms, the adjacent side edges of said members being spaced a relatively short distance apart when said other members being unfolded and substantially coplanar, the portion of said arms adjacent said pivotally supporting means being sufficiently thin in the horizontal dimension transverse to its lateral length to provide clearance at said portion for the arms and pivotally supporting means upon folding over the last of said other members, said other members being relatively thin in comparison to the length from an off-centered axis of said member to its supporting hinge pin, whereby either one of said other members may be initially folded over said first member and followed by the last of said other members to cause said members to be superimposed one against the other without overlap along their edges.

References Cited in the file of this patent

UNITED STATES PATENTS

| | | |
|---|---|---|
| 369,740 | Saltar | Sept. 13, 1887 |
| 381,452 | Wiederer | Apr. 17, 1888 |
| 500,310 | Willard | June 27, 1893 |
| 542,594 | Mosher et al. | July 9, 1895 |
| 687,970 | Seymoure | Dec. 3, 1901 |
| 838,807 | Petroskey | Dec. 18, 1906 |
| 1,078,502 | Hermann | Nov. 11, 1913 |
| 1,088,765 | Booth | Mar. 3, 1914 |

FOREIGN PATENTS

| | | |
|---|---|---|
| 453,856 | France | Nov. 11, 1913 |
| 466,928 | France | Mar. 3, 1914 |
| 470,465 | France | June 16, 1914 |
| 886,605 | France | Oct. 20, 1943 |